USOO6244470B1

United States Patent
Harley-Wilmot

(10) Patent No.: US 6,244,470 B1
(45) Date of Patent: Jun. 12, 2001

(54) MEASURED QUANTITY LIQUID DISPENSER

(76) Inventor: Sandria C. Harley-Wilmot, 21 Fountain Dr., Apt 2, Lakewood, NJ (US) 08701

( * ) Notice: Subject to any disclaimer, the term of this patent is extended or adjusted under 35 U.S.C. 154(b) by 0 days.

(21) Appl. No.: 09/468,755

(22) Filed: Dec. 21, 1999

(51) Int. Cl.[7] .................................................. B67B 5/00
(52) U.S. Cl. ................... 222/153.14; 222/158; 222/205; 222/450
(58) Field of Search .................................... 222/217, 422, 222/434, 207, 212, 158, 211, 109, 521, 153.14, 425, 450, 448, 205

(56) References Cited

U.S. PATENT DOCUMENTS

| | | | |
|---|---|---|---|
| 1,384,687 | * 7/1921 | Bushell et al. | 222/450 |
| 2,282,110 | 5/1942 | Angell | 221/105 |
| 2,339,644 | * 1/1944 | Lucas | 222/425 |
| 2,416,811 | * 3/1947 | Bailey | 222/450 |
| 3,141,579 | * 7/1964 | Medlock | 222/207 |
| 3,197,086 | 7/1965 | Raddysh | 222/365 |
| 3,209,961 | * 10/1965 | Wassell | 222/443 |
| 4,157,768 | * 6/1979 | Britt | 222/42 |
| 4,180,106 | 12/1979 | Coetzee | 141/294 |
| 4,427,041 | 1/1984 | Coetzee | 141/294 |
| 5,186,367 | 2/1993 | Hickerson | 222/207 |
| 6,006,952 | * 12/1999 | Lucas | 222/211 |

FOREIGN PATENT DOCUMENTS 2 630 003 * 4/1988 (FR) .................................... 222/450

* cited by examiner

*Primary Examiner*—Kevin Shaver
*Assistant Examiner*—Melvin A. Cartagena
(74) *Attorney, Agent, or Firm*—Henderson & Sturm LLP

(57) ABSTRACT

A measured quantity liquid dispenser including a liquid supply container and an attached liquid dispensing chamber. The dispensing chamber has a hinged lid with a locking ledge. A slide plate is moveable between a first position where flow of liquid between the supply container and the dispensing chamber is prevented and the lid of the dispensing chamber is unlocked, and a second position where flow is permitted between the supply container and the dispensing chamber and the lid of the dispensing chamber is locked. The liquid dispenser is inverted with the slide plate moved to the second position to refill the dispensing chamber. The dispenser is especially useful to limit a child's use of a liquid composition such as mouthwash or shampoo.

8 Claims, 1 Drawing Sheet

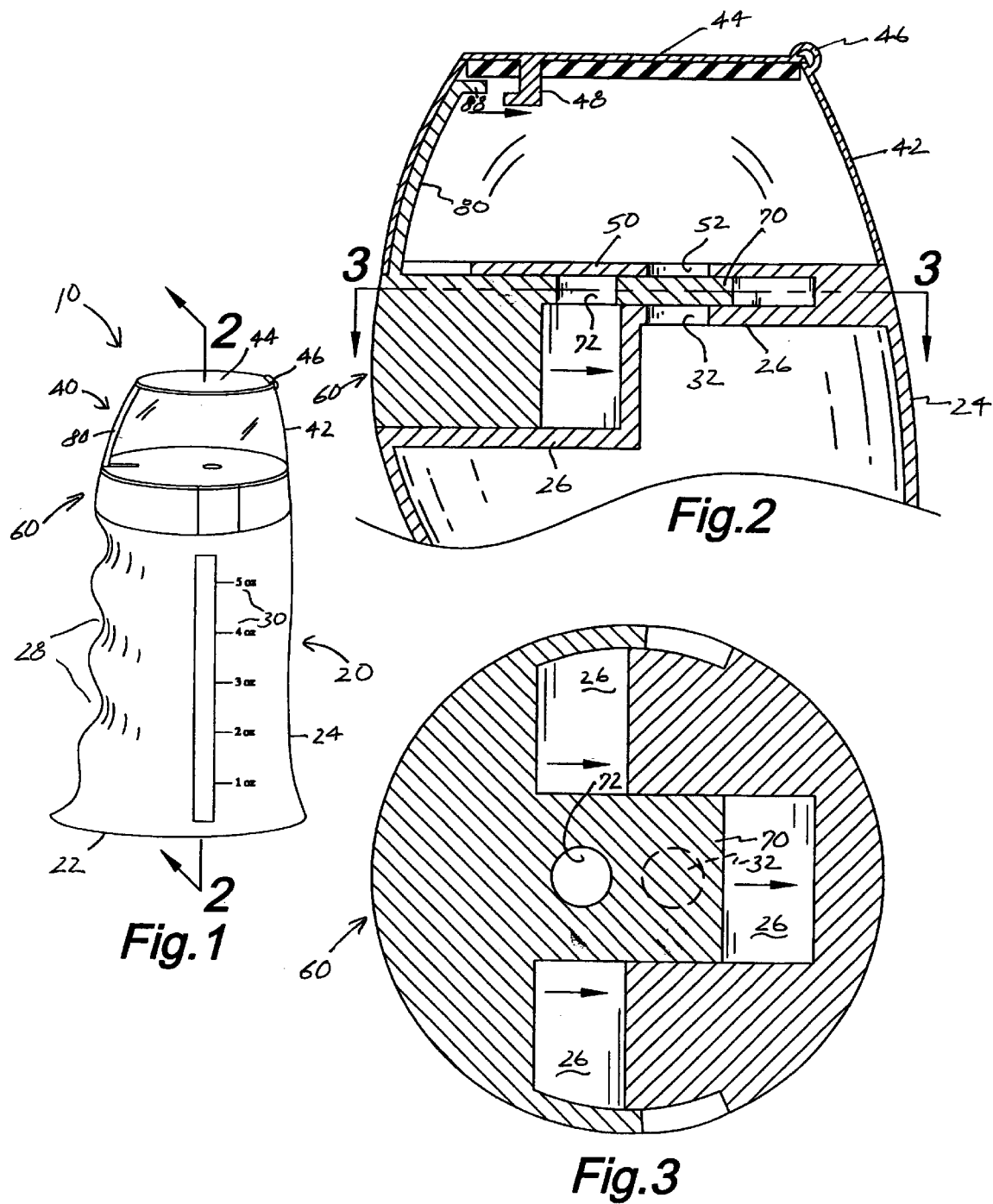

MEASURED QUANTITY LIQUID DISPENSER

BACKGROUND OF THE INVENTION

1. Field of the Invention

The present invention relates to the field of liquid dispensers, and more particularly to a liquid dispenser that dispenses a predetermined volume of liquid.

2. Description of the Related Art

As can be seen by reference to the following U.S. Pat. Nos. 2,282,110; 3,197,086; 4,180,106; and 4,427,041 the prior art is replete with myriad and diverse liquid dispensers.

While all of the aforementioned prior art constructions are more than adequate for the basic purpose for which they have been specifically designed, they are uniformly deficient with respect to their failure to provide a simple, efficient and practical measured quantity liquid dispenser.

As a consequence of the foregoing situation, there has existed a need for a new and improved measured quantity liquid dispenser and the provision of such a construction is a stated objective of the present invention.

SUMMARY OF THE INVENTION

Briefly stated, the present invention provides a measured quantity liquid dispenser including a liquid supply container and an attached liquid dispensing chamber. The dispensing chamber has a hinged lid with a locking ledge. A slide plate is moveable between a first position where flow of liquid between the supply container and the dispensing chamber is prevented and the lid of the dispensing chamber is unlocked, and a second position where flow is permitted between the supply container and the dispensing chamber and the lid of the dispensing chamber is locked. The liquid dispenser is inverted with the slide plate moved to the second position to refill the dispensing chamber. The dispenser is especially useful to limit a child's use of a liquid composition such as mouthwash or shampoo.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the measured quantity liquid dispenser of the present invention;

FIG. 2 is an enlarged partial sectional view taken along line 2—2 of FIG. 1 illustrating the slide plate in a position where the hinged lid is unlocked and flow between the supply container and dispensing chamber is prevented; and FIG. 3 is a sectional view taken along line 3—3 of FIG. 2 illustrating the operation of the slide plate as it is moved from a position preventing flow to a position allowing flow from the supply container to the dispensing chamber.

DETAILED DESCRIPTION OF THE INVENTION

As can be seen by reference to the drawings, and in particulary to FIG. 1, the measured quantity liquid dispenser that forms the basis of the present invention is designated generally by reference number (10). The dispenser (10) includes a liquid supply container (20), a liquid dispensing chamber (40), and a slide plate mechanism (60).

The supply container (20) has a bottom wall (22), a sidewall (24), and a top wall (26). The sidewall (24) has a number of indentations (28) to facilitate gripping by the user, and a number of volume indicia (30) are imprinted on the sidewall (24) to inform the user of the remaining volume. The top wall (26) has an outlet port (32) formed therethrough (FIG. 2).

The dispensing chamber (40) is attached to the supply container (20) and includes a transparent sidewall (42) and a lid (44) pivotally attached to the sidewall (42) by a hinge (46). A locking ledge (48) extends down from the lid (44) as shown in FIG. 2. The chamber (40) also includes a bottom wall (50) having an inlet port (52) formed therethrough. FIG. 2 shows that the inlet port (52) is spaced directly above the outlet port (32) of the supply container (20).

The slide plate mechanism (60) slideably engages the top wall (26) of the supply container (20) and the bottom wall (50) of the dispensing chamber (40). The slide plate (60) includes a horizontally extending tab (70) that has an opening (72) formed therethrough. The slide plate (60) also carries a vertically extending finger (80) with a horizontally directed locking end (88).

The slide plate (60) is movable between a first position shown in FIGS. 2 and 3, and a second position indicated by the directional arrows in FIGS. 2 and 3. In the first position of the slide plate (60), the opening (72) in the tab (70) is horizontally spaced away from the outlet port (32) of the supply container (20) and the inlet port (52) of the dispensing chamber (40), thus preventing flow of liquid. Also, in the first position the locking end (88) of the finger (80) is spaced away from the locking ledge (48) allowing the lid (44) to be opened.

In the second position, the opening (72) in the tab (70) is aligned with the outlet port (32) and the inlet port (52) allowing flow of liquid from the supply container (20) to the dispensing chamber (40) when the dispenser (10) is inverted. Also, in the second position the locking end (88) of the finger (80) engages the locking ledge (48) on the lid (44) preventing it from opening while the dispenser is inverted.

It is to be understood that the supply container (20) may be of various sizes and the dispensing chamber (40) may also be of any desired size, although one-half fluid ounce and one fluid ounce volumes for the dispensing chamber (40) are appropriate sizes for liquid compositions such as mouthwash and shampoo.

In use, the slide plate (60) is depressed to lock the lid (44) and align the opening (72) with the outlet and inlet ports (32, 52). The dispenser (10) is then inverted to fill the dispensing chamber (40). The slide plate (60) is then retracted, the dispenser (10) returned to the upright position, and the unlocked lid (44) may be then opened to dispense the measured amount of liquid. The dispenser (10) provides an appropriate and safe amount of material and economically controls a child's use of liquid compositions such as mouthwash or shampoo.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A measured quantity liquid dispenser, comprising:

a liquid supply container disposed to receive a supply of a liquid composition, the supply container including a bottom wall, a sidewall, and a top wall having an outlet port formed therethrough;

a liquid dispensing chamber attached to the supply container, the dispensing chamber including a sidewall, a hinged lid pivotally attached to an upper portion of the sidewall, and a bottom wall having an inlet port formed therethrough, the inlet port being spaced above and vertically aligned with the outlet port of the supply container;

a slide plate disposed in movable engagement with the top wall of the supply container and the bottom wall of the dispensing chamber, the slide plate including a horizontally disposed tab having an opening formed therethrough, the slide plate being movable between a first position wherein the opening in the tab is horizontally spaced from the outlet port and the inlet port, and a second position wherein the opening in the tab is aligned with the outlet port and the inlet port allowing the liquid composition to flow from the supply container to the dispensing chamber when the dispenser is held in an inverted position the slide plate further including a vertically disposed finger disposed within the dispensing chamber and having a horizontally directed locking end, and wherein the hinged lid of the dispensing chamber carries a downwardly directing locking ledge disposed to receive the locking end of the finger when the slide plate is moved to the second position.

2. The liquid dispenser of claim 1 wherein the finger includes an outer surface that matingly engages an interior portion of the sidewall of the dispensing chamber when the slide plate is moved to the first position.

3. The liquid dispenser of claim 2 wherein the dispensing chamber has a volume of about one fluid ounce.

4. The liquid dispenser of claim 3 wherein the supply container includes a plurality of indentations formed in the sidewall of the supply container to facilitate gripping.

5. The liquid dispenser of claim 2 wherein the supply container includes a plurality of indentations formed in the sidewall of the supply container to facilitate gripping.

6. The liquid dispenser of claim 1 wherein the dispensing chamber has a volume of about one fluid ounce.

7. The liquid dispenser of claim 6 wherein the supply container includes a plurality of indentations formed in the sidewall of the supply container to facilitate gripping.

8. The liquid dispenser of claim 1 wherein the supply container includes a plurality of indentations formed in the sidewall of the supply container to facilitate gripping.

* * * * *